United States Patent
Allen et al.

(10) Patent No.: US 6,399,140 B1
(45) Date of Patent: Jun. 4, 2002

(54) WHEY SALT POWDER, PROCESS FOR ITS PRODUCTION AND ITS USE

(75) Inventors: Marjaana Allen, Turenki; Kaija Vesanen, Vammala; Matti Harju, Nummela, all of (FI)

(73) Assignee: Valio Ltd., Helsinki (FI)

( * ) Notice: Subject to any disclaimer, the term of this patent is extended or adjusted under 35 U.S.C. 154(b) by 0 days.

(21) Appl. No.: 09/601,996

(22) PCT Filed: Feb. 10, 1999

(86) PCT No.: PCT/FI99/00100

§ 371 (c)(1),
(2), (4) Date: Sep. 29, 2000

(87) PCT Pub. No.: WO99/40798

PCT Pub. Date: Aug. 19, 1999

(30) Foreign Application Priority Data

Feb. 12, 1998 (FI) .................................................. 980324

(51) Int. Cl.⁷ ................................................ A23L 1/237
(52) U.S. Cl. ..................... 426/649; 426/491; 426/495; 426/583; 426/648
(58) Field of Search ................................ 426/649, 580, 426/583, 74, 648, 491, 495

(56) References Cited

FOREIGN PATENT DOCUMENTS

| EP | 124254 | 3/1984 |
|---|---|---|
| EP | 291980 | 5/1988 |
| EP | 408756 | 12/1989 |
| EP | 0 536 612 | 4/1993 |
| FI | 98696 | 4/1997 |

OTHER PUBLICATIONS

Rasche et al., AN 93(12):PO158 FSTA, abstracting DE 4133094, 1993.*
Zeisel et al., J. Nutr. 1986, 116, 50–58.
88–145010; Derwent Abstract; Apr. 1988.
88–202816; Derwent Abstract; Jun. 1988.
1989: 211296 Caplus; Abstract of JP A 63087944; Apr. 1988.
Engl Abstract of JP 63141561; Jun. 1988.

* cited by examiner

*Primary Examiner*—Leslie Wong
(74) *Attorney, Agent, or Firm*—Burns, Doane, Swecker & Mathis, L.L.P.

(57) ABSTRACT

The invention relates to a whey salt product, which is not bitter in taste, and which is characterized by containing 19 to 27% potassium, 0.5 to 2% calcium, 5 to 7% sodium, 0.1 to 1% magnesium, 17 to 37% chloride and 0.5 to 3 % phosphorus and further 10 to 20% protein and 10 to 35% lactose, to a process for its production and its use as a table salt substitute. According to the invention, the whey salt powder is prepared in such a way that whey or an ultrafiltration. permeate with a dry matter content of 20% by weight at the most, obtained from milk or whey, is filtered through membranes by using nanofiltration membranes, the permeate with a dry matter content of 0.1 to 1.0% by weight obtained from nanofiltration is concentrated and finally dried to powder.

13 Claims, No Drawings

WHEY SALT POWDER, PROCESS FOR ITS PRODUCTION AND ITS USE

The invention relates to a whey salt powder, which is not bitter in taste, a process for its production, and its use. The whey salt powder in accordance with the invention is a product containing natural minerals of whey and it may replace totally or partly the conventional salt used in food and food products.

In the production of cheese, when taste-softening casein and fat are precipitated from milk into a cheese mass, what remains is whey with a salty taste. The salty taste of whey restricts its use in food industry. To reduce the salt content in whey, various methods have been developed, such as electrodialysis, ion exchange, and most recently nanofiltration. In fact, nanofiltration is a concentration process based on reverse osmosis, in which membranes used are so coarse that, in addition to water, particularly monovalent ions permeate the membrane. It is well suited for pre-concentration of dilute solutions, such as whey, from a dry matter content of 6% to 24% at the most. In the present publication, percentages refer to percentages by weight, unless otherwise indicated.

With the above desalination processes and combinations thereof is produced demineralized whey powder, which is generally used e.g. in baby foods, chocolate and ice cream. For instance in Finland, the major part of whey is used for producing demineralized whey powder. In these processes, the removed salts pass through wastewater treatment plants into water systems.

Another common whey processing method is ultrafiltration. In this process whey proteins are concentrated by means of a membrane system, which retains macromolecular components of whey. The concentrate is dried to whey protein powder, which is commonly used in food industry, for instance as a milk powder substitute. Also milk can be ultrafiltered similarly.

In the ultrafiltration of both whey and milk, a permeate passing through the membrane contains the lactose and salts as well as other micromolecular substances. The ultrafiltration permeate is commonly used for producing lactose by crystallization. The residual permeate mother liquid tastes very salty and it is extremely difficult to dry, so it is commonly sold at a very low price as a liquid concentrate for animal feed.

Currently, the whey salts have generally a negative value only and they end up in waste water or animal feeding, even though the quantities used are restricted even in animal feeding. Thus there is a constant need to find ways how the salts in whey can be put to good use.

The mineral composition of whey is highly physiological, since it is the same as that of blood serum. It contains valuable minerals: potassium, calcium and magnesium, and its sodium content is rather low. Table 1 shows the mineral composition of whey calculated in percentages by weight of dry matter.

TABLE 1

| Mineral composition of whey (% of dry matter) | |
| --- | --- |
| minerals | 8.8 |
| calcium | 0.9 |
| sodium | 0.8 |
| potassium | 2.2 |
| magnesium | 0.1 |
| phosphorus | 0.7 |

TABLE 1-continued

| Mineral composition of whey (% of dry matter) | |
| --- | --- |
| chloride | 2.0 |
| citrate | 2.5 |
| lactate | 1.5 |

The high potassium content of whey protects a human organism from adverse effects of sodium. Magnesium in turn prevents hypertension. As anions, whey contains phosphate, citrate and lactate in addition to chloride. If the salts in whey could be separated and prepared into a dry product, a natural, mineral-salt-like preparation would be achieved.

Mineral salts substituting table salt (NaCl), prepared by mixing various chemicals, have been disclosed (European Patent 124 254; German Patent 31 07 800). However, these are not natural mineral salt preparations.

European Patent Applications 408 756 and 291 980 disclose use of a permeate mother liquid, an inconvenient by-product of lactose processing, as a salt substitute. The permeate mother liquid, the composition of which is presented in Table 2, contains mainly lactose, however, so it is not suitable for a mineral salt as such.

TABLE 2

| Composition of permeate mother liquid (% of dry matter) | |
| --- | --- |
| lactose | 56 |
| protein | 15 |
| minerals | 22 |

It is also almost impossible to dry the permeate mother liquid due to its high hygroscopicity.

Attempts have been made to remove salts from the permeate mother liquid by nanofiltration and to crystallize the obtained salt solution into some kind of whey salt. European Patent Application 536 612 discloses a process for removing salts from a salty permeate mother liquid by nanofiltration, whereafter the permeate from nanofiltration is evaporated and from the residue is crystallized mainly potassium chloride, in which some of other components of the permeate remain as impurities. The composition of the obtained salt product is presented in Table 2 on page 5 of said European Patent publication.

The process in accordance with European Patent Application 536 612 is impractical, since therein nanofiltration is needed as an extra process step which is used for desalination only. However, nanofiltration does not suit well for treating concentrated solutions, since process pressure must exceed the osmotic pressure of the solution in order to make water flow in the osmotically 'wrong' direction. Further problems with said known process are poor crystallization yield, difficult after-treatment of crystal mass, and residual liquid from potassium chloride crystallization, for which no application has been set forth.

Surprisingly, we have now been able to produce a whey salt powder, which is a natural, mineral-salt-like preparation and which can be used as a table salt substitute. This whey salt powder is not bitter in taste.

The whey salt powder in accordance with the invention is characterized by containing

| | |
|---|---|
| potassium | 19–27% |
| calcium | 0.5–2% |
| sodium | 5–7% |
| magnesium | 0.1–1% |
| chloride | 17–37% |
| phosphorus | 0.5–3% |
| and further | |
| protein | 10–20% |
| lactose | 10–35% |

The novel whey salt powder developed by us has a saltier taste than the salt preparation disclosed in Finnish Patent 98696, so to achieve the same salty taste, new whey salt powder is needed in much smaller quantities than said known salt preparation. The whey salt powder in accordance with the invention is not, however, bitter in taste, even though its potassium content is higher than that of the salt preparation disclosed in Finnish Patent 98696, but not so high as in the salt preparation disclosed in European Patent Application 536 612. Excessively high potassium content is known to make salt bitter in taste.

In the whey salt powder in accordance with the invention, proteins and lactose are present to cover bitterness. Our experiments proved that an aqueous solution prepared from the whey salt powder in accordance with the invention is not bitter, but both an aqueous solution prepared from mere potassium chloride, equal in potassium content, and an aqueous solution of whey salt prepared with the process in accordance with European Patent Application 536 612 are bitter in taste, as it appears from examples 6 and 7 here below.

The composition of the whey salt powder disclosed in Table 2 on page 5 of European Patent Application 536 612 substantially differs from the whey salt powder of the invention defined in claim 1, since the known whey salt powder is mainly ash (83.5%) being composed of bitter potassium (42%) and chloride (38%). This results from the production process of the known whey salt powder, in which the potassium chloride is crystallized from a concentrated nanofiltration permeate. Because of the high potassium chloride content said known whey salt is clearly bitterer and worse in taste than the new whey salt powder of the invention which is prepared by the process disclosed in the present patent application.

Since the whey salt powder of the invention and the solution made therefrom are not bitter, particularly as compared with a salt solution with equal potassium content, they are excellent substitutes for table salt and other salt preparations both in industry and in a variety of cooking facilities.

An advantageous whey salt powder of the invention contains

| | |
|---|---|
| potassium | 25–26% |
| calcium | 0.8–2% |
| sodium | 5–6% |
| magnesium | 0.1–0.2% |
| chloride | 32–37% |
| phosphorus | 1.4–3% |
| and further | |
| protein | 10–20% |
| lactose | 10–35% |

The whey salt powder contains protein most preferably 10 to 16% and lactose most preferably 10 to 15%.

The most advantageous whey salt powder of the invention is the whey salt powder of. Example 1, whose composition of the main components is presented in Table 3 below.

At the same time, we have unexpectedly discovered a new process for producing whey salt powder, whereby whey salt powder can be produced economically, easily and with a good yield. In accordance with the invention, whey salt powder is obtained, when whey or whey permeate is appropriately treated with membrane filtration, whereby lactose and proteins are removed, whereafter the obtained permeate is dried to powder.

The new process for producing whey salt powder in accordance with the invention is characterized in that whey or ultrafiltration permeate obtained from milk or whey, whose dry matter content is at most 20% by weight, is filtered with membrane by using nanofiltration membranes, the permeate with a dry matter content of 0.1 to 1.0% by weight, obtained through nanofiltration, is concentrated and finally it is dried to powder.

As stated in the above specification, nanofiltration does not suit well for treating concentrated solutions. However, in the process of the invention, nanofiltration is utilized to the full, in the respect that it is used here as a concentration process to replace evaporation, and simultaneously, some of the salts are removed, which improves the use value of whey concentrate. On the other hand, the whey powder of the invention contains all whey components that have passed through the nanofiltration membrane. Thanks to the process of the invention, all the dry matter in whey can thus be utilized. By using the process of the invention, more whey salt is recovered than previously, and at the same time, wastewater problems caused by whey are avoided, since there will be no waste water at all.

In the new method of the invention, starting material can be whey, such as cheese whey, casein whey or curd whey, or a permeate obtained from milk or whey by ultrafiltration, the dry matter content of the whey or permeate being at most 20% by weight, suitably at most 15% by weight and preferably 5 to 10% by weight. If necessary, prior to nanofiltration the dry matter content of the whey or permeate used as the starting material is adjusted to any one of the above values.

Nanofiltration employs semi-permeable membranes, which are preferably 150 to 300 Da membranes. Suitable are, for instance, Desal-5 DK membranes, manufactured by Osmonics, USA, or Dow NF45 membranes, manufactured by Dow, USA.

A permeate obtained through nanofiltering whey or ultrafiltration permeate is a dilute salt solution with a dry matter content of 0.1 to 1.0% by weight, preferably 0.3 to 0.5% by weight. This permeate can be concentrated either by evaporation or by a combination of reverse osmosis and evaporation suitably to a dry matter content of 30 to 40% by weight, preferably to a dry matter content of 35 to 40% by weight. In said reverse osmosis, by which the permeate is first suitably concentrated to a dry matter content of 4 to 24% by weight, reverse osmosis equipment having membranes with 99% Cl-ion rejection can be suitably used. Suitable membranes are, for instance, TFC® 2822HR-NW type membranes manufactured by Fluid Systems, USA.

We found unexpectedly that the above-described whey salt concentrate can be readily spray-dried with a conventional drier used for drying milk powder and whey powder, even though both lactose and salts are considered extremely hygroscopic and difficult to dry. The specific weight of dry powder thus obtained is about 0.4 to 0.6 g/ml and its moisture content is about 2%.

Obviously, micromolecular nitrogen compounds passing through the nanofiltration membrane act as a carrier in the product and, on the other hand, the most hygroscopic salts do not pass the nanofiltration membrane.

Undoubtedly, fear of steel corrosion in the equipment, when operating in high chloride contents, has impeded utilization of whey salts. However, in our experiments we did not find corrosion in the equipment, nor raised iron content in the whey salt powder.

In the above-described manner, whey salt powder can be produced simply and with good yield from the salt solution which currently burdens wastewater treatment plants, the whey salt powder being a natural mineral salt preparation and a table salt substitute both in industry and in households, with which the table salt can be replaced totally or partly in food and food products.

In the following examples the invention is described in greater detail.

EXAMPLE 1

Cheese whey with a dry matter content of 6.5% was used as a raw material. The whey contained 73% lactose, 12% protein and 8% ash of the dry matter. The whey was separated and sieved, whereafter it was pasteurized and nanofiltered through semi-permeable membranes (150–300 Da; Desal-5 DK). Of the whey salts mainly the salts composed of monovalent ions (sodium, potassium, chloride) were removed together with water through the membranes into the permeate. The removal into the permeate comprised-50% of the salts and 1% of the lactose.

In filtering the whey, dry matter content of the retentate was 22%. With the equipment used, the feed flow rate was 25,000 l/h, the flow rate of the retentate was 5,000 l/h and the flow rate of the permeate 20,000 l/h. The filtering temperature was 20° C. and the process pressure was 22 bar.

The nanofiltration permeate (dry matter content 0.4%) was further concentrated with reverse osmosis equipment having membranes with 99% Cl-ion rejection. The membranes were of type TFC® 2822HR-NW. Retentate with a dry matter content of 4% was thus obtained, and the permeate could be reused as industrial process water.

The obtained reverse osmosis concentrate was concentrated by evaporation to a dry matter content of 40% and dried to powder with a conventional spray drier.

The amounts, in percentages by weight of the total composition, of the main ingredients of the obtained whey salt powder are presented in Table 3.

TABLE 3

Main ingredients of whey salt powders

| | Cheese whey (example 1) | Curd whey (example 3) | Casein whey (example 2) | Milk permeate (example 4) | Whey permeate (example 5) |
| --- | --- | --- | --- | --- | --- |
| Potassium | 26% | 26% | 25% | 26% | 26% |
| Calcium | 0.9% | 2% | 2% | 0.8% | 0.8% |
| Sodium | 6% | 5% | 5% | 6% | 6% |
| Magnesium | 0.1% | 0.1% | 0.1% | 0.1% | 0.1% |
| Chloride | 32% | 33% | 37% | 32% | 33% |
| Phosphorus | 1.5% | 3% | 3% | 1.5% | 1.4% |
| Protein | 15% | 15% | 15% | 14% | 14% |
| Lactose | 13% | 13% | 12% | 14.5% | 15% |

EXAMPLE 2

Raw material was casein whey whose dry matter content was 5.6%. The whey contained 70% lactose, 16% protein and 14% ash of the dry matter. The whey was seperated and sieved, and it was pasteurized and nanofiltered in accordance with Example 1. The permeate from nanofiltration was concentrated by reverse osmosis and the concentrate was evaporated and dried to powder in accordance with Example 1.

The composition of the main ingredients in the obtained whey salt powder is presented in Table 3.

EXAMPLE 3

Raw material was curd whey whose dry matter content was 5.7%. The curd whey contained 68% lactose, 8% protein and 9% ash of the dry matter. The seperated and sieved whey was pasteurized and nanofiltered in accordance with Example 1. The permeate from nanofiltration was concentrated by reverse osmosis and the concentrate was evaporated and dried to powder in accordance with Example 1.

The composition of the main ingredients in the obtained whey salt powder is presented in Table 3.

EXAMPLE 4

Raw material was a permeate with a dry matter content was 6%, obtained by ultrafiltration from fat-free milk. The permeate contained 83% lactose, 5% protein and 9% ash of the dry matter. The permeate was pasteurized and nanofiltrated in accordance with Example 1. The permeate from nanofiltration was concentrated by reverse osmosis and the concentrate was evaporated and dried to powder in accordance with Example 1.

The composition of the main ingredients in the obtained whey salt powder is presented in Table 3.

EXAMPLE 5

Raw material was a permeate with a dry matter content of 10%, obtained by ultrafiltration from whey. The whey permeate contained 83% lactose, 5% protein and 8% ash of the dry matter. The permeate was pasteurized and nanofiltrated in accordance with Example 1. The permeate from nanofiltration was concentrated by reverse osmosis and the concentrate was evaporated and dried to powder in accordance with Example 1.

The composition of the main ingredients in the obtained whey salt powder is presented in Table 3.

EXAMPLE 6

Aqueous solutions with equal potassium content (1.9 g/l) were prepared from the whey salt powder of the invention made from cheese whey and from potassium chloride (KCl). In sensory evaluation, ten persons tested the solutions and evaluated their bitterness on the scale from 1 to 10. A T-test was conducted on the material. The average bitterness of the potassium chloride solution was 6.87 and that of the whey salt solution 1.74. The difference in bitterness is statistically significant (p=0.000089).

EXAMPLE 7

Whey salt was prepared in accordance with the method disclosed in European Patent Application EP-A1-0 536 612 and the obtained known product was compared in sensory evaluation with the whey salt powder of the present invention made from cheese whey. There were eight evaluators and the evaluation scale ranged from 0 to 10. The evaluators were requested to evaluate the taste of the 1% solutions in view of their bitterness and pleasantness. The bitterness of the above-mentioned known whey salt was 5.72 and the pleasantness 2.67. The bitterness of the whey salt of present invention was only 2.1 and the pleasantness of taste was 6.22. The difference in bitterness was statistically significant (p=0.0074).

We claim:

1. A whey salt powder comprising, in weight %:

| | |
|---|---|
| potassium | 19–27% |
| calcium | 0.5–2% |
| sodium | 5–7% |
| magnesium | 0.1–1% |
| chloride | 17–37% |
| phosphorus | 0.5–3% |
| protein | 10–20% |
| lactose | 10–35%. |

2. A whey salt powder as claimed in claim 1, comprising, in weight %:

| | |
|---|---|
| potassium | 25–26% |
| calcium | 0.8–2% |
| sodium | 5–6% |
| magnesium | 0.1–0.2% |
| chloride | 32–37% |
| phosphorus | 1.4–3% |
| protein | 10–16% |
| lactose | 10–15%. |

3. A process for producing the whey salt powder as claimed in claim 1, comprising filtering a whey or an ultrafiltration permeate whose dry matter content is at most 20% by weight obtained from a starting material comprising milk or whey with nanofiltration membranes to obtain a permeate with a dry matter content of 0.1 to 1.0% by weight, concentrating the permeate, and drying the concentrate to a powder.

4. The process as claimed in claim 3, wherein the starting material is whey, the dry matter content of the whey being at most 15% by weight.

5. The process as claimed in claim 3, wherein prior to nanofiltration with membranes the dry matter content of the whey or the permeate obtained from milk or whey is adjusted to a value which is at most 20% by weight.

6. The process as claimed in claim 3, wherein nanofiltration membranes of 150–300 Da are used in nano-filtration.

7. The process as claimed in claim 6, wherein the permeate obtained from nanofiltration is concentrated by evaporation to a dry matter content of 30 to 40% by weight.

8. The process as claimed in claim 6, wherein the permeate obtained from nanofiltration is concentrated first with reverse osmosis equipment having membranes with 99% Cl-ion rejection, to a dry matter content of 4 to 24% by weight, and thereafter by evaporation to a dry matter content of 30 to 40% by weight.

9. The process as claimed in claim 3, wherein the concentrated nanofiltration permeate is dried to powder by spray drying.

10. A method of using a whey salt powder comprising at least partially substituting the whey salt powder of claim 1 for conventional salt in food and food products.

11. The process of claim 4, wherein the starting material comprises at least one of cheese whey, casein whey, curd whey or permeate obtained by ultrafiltration of milk or whey, the dry matter content of the starting material is at most 15% by weight.

12. The process of claim 5, wherein the dry matter content is at most 15% by weight.

13. The process of claim 5, wherein the dry matter content is at most 10% by weight.

* * * * *